(12) United States Patent
Oh

(10) Patent No.: US 8,862,919 B2
(45) Date of Patent: Oct. 14, 2014

(54) POWER CONTROL METHOD FOR IMAGE FORMING APPARATUS TO SELECTIVELY CONTROL SWITCHING CIRCUIT UNIT TO MANAGE POWER SUPPLY ACCORDING TO LAST KNOWN POWER STATUS WHEN POWER IS RESUMED AFTER AN ABNORMAL POWER FAILURE

(75) Inventor: Han-sang Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 521 days.

(21) Appl. No.: 13/067,448

(22) Filed: Jun. 1, 2011

(65) Prior Publication Data

US 2012/0127517 A1    May 24, 2012

(30) Foreign Application Priority Data

Nov. 23, 2010 (KR) ........................ 10-2010-0116746

(51) Int. Cl.
| | | |
|---|---|---|
| G06F 1/00 | (2006.01) | |
| G06F 1/32 | (2006.01) | |
| G06F 1/30 | (2006.01) | |
| G03G 15/00 | (2006.01) | |

(52) U.S. Cl.
CPC .. *G06F 1/32* (2013.01); *G06F 1/30* (2013.01); *G03G 15/5004* (2013.01)
USPC ........................................................ 713/323

(58) Field of Classification Search
CPC ........................................................ G06F 1/30
See application file for complete search history.

(56) References Cited

U.S. PATENT DOCUMENTS

| | | | |
|---|---|---|---|
| 6,577,825 B1* | 6/2003 | Gonnella et al. | 399/38 |
| 2007/0106915 A1* | 5/2007 | Shie | 713/300 |
| 2010/0091328 A1* | 4/2010 | Tsukada | 358/1.15 |
| 2011/0131115 A1* | 6/2011 | Yamanaka et al. | 705/27.2 |
| 2011/0271131 A1* | 11/2011 | Lefebvre et al. | 713/323 |

FOREIGN PATENT DOCUMENTS

JP    2009-251275    10/2009

\* cited by examiner

*Primary Examiner* — Thomas Lee
*Assistant Examiner* — Zhipeng Wang
(74) *Attorney, Agent, or Firm* — Staas & Halsey LLP

(57) ABSTRACT

An image forming apparatus and a power control method thereof are provided. The image forming apparatus includes: an image forming unit which forms an image; a power supply which supplies operating power for the image forming apparatus; a switching circuit unit which switches to selectively supply the operating power; a memory unit which stores information about power status of the switching circuit unit; and a controller which outputs a power control signal for controlling a switching operation of the switching circuit unit in accordance with the information about the power status stored in the memory unit if power is abnormally shut off and then supplied again from the power supply to the switching circuit unit. With this, the image forming apparatus operates in a last power status, so that power can be prevented from being wastefully consumed or data can be prevented from being lost.

24 Claims, 9 Drawing Sheets

POWER CONTROL METHOD FOR IMAGE FORMING APPARATUS TO SELECTIVELY CONTROL SWITCHING CIRCUIT UNIT TO MANAGE POWER SUPPLY ACCORDING TO LAST KNOWN POWER STATUS WHEN POWER IS RESUMED AFTER AN ABNORMAL POWER FAILURE

CROSS-REFERENCE TO RELATED APPLICATIONS

This application claims priority benefit from Korean Patent Application No. 10-2010-0116746, filed on Nov. 23, 2010 in the Korean Intellectual Property Office, the disclosure of which is incorporated herein by reference.

BACKGROUND

1. Field

Exemplary embodiments relate to an image forming apparatus and a power control method thereof, and more particularly, to an image forming apparatus, power of which is controlled by turning on/off direct current (DC) power of a secondary circuit, and a power control method thereof.

2. Description of the Related Art

An image forming apparatus forms an image to be printed on a printing medium. The image forming apparatus may be embodied in a printer, a copy machine, a facsimile, a multifunction peripheral having two or more functions, etc.

For power control of the image forming apparatus, there may be used a method of preparing a mechanical switch at one side of the image forming apparatus and completely shutting off operating power supplied for operation.

However, in the case where a method of turning on/off alternating current (AC) power of a primary circuit is used, an AC harness of a power inlet generally placed in a back side of the image forming apparatus has to be connected to a front side in order to place the switch in a front side of the image forming apparatus for a user's convenience in operating the switch. This causes problems in designing the apparatus and increases production costs.

Also, because the mechanical switch is turned on/off by a user regardless of operations such a printing, data transmission/reception, data storage, etc. of the image forming apparatus, damage may occur. For example, if the switch is turned off while the printing or the like job is performed, data may be abnormally (improperly or incorrectly) backed up and thus lost, or a logic circuit or the like inner parts of the image forming apparatus may be damaged.

Thus, there may be employed a method of controlling the DC power through a secondary circuit provided with a small capacity switching device such as a transistor (e.g., field effect transistor (FET).

Since the above method of switching on/off the DC power of the secondary circuit uses the small capacity device, it is possible to keep a standby power of 1 watt (1 W) or less in an off status. Thus, the data backup is normally achieved even when the switch is turned off, thereby preventing the data from loss or the parts from damage. Accordingly, the method of switching on/off the DC power of the secondary circuit has widely spread. Further, both the primary circuit and the secondary circuit may be used.

Although it is possible to protect data from loss due to the power switch off through the method of turning on/off the secondary circuit, there is still a problem in that data may be lost because the data backup operation is not implemented in the case of unexpected power-off such as a power failure.

Also, when power supplying is resumed after the unexpected (abnormal) power-off due to the power failure, switch operation of the primary circuit, etc. is terminated, and the image forming apparatus is forcibly turned on or off on the basis of preset information since it has no information about a previous power status.

Accordingly, if the image forming apparatus is previously set up to be turned on, power is supplied to the image forming apparatus and thus wastefully consumed. On the other hand, if the image forming apparatus is previously set up to be turned off, printing data received before the unexpected power-off and being on standby, fax data being received, or the like may be lost and it is thus inconvenient for a user.

For the convenience in power control, an additional microcomputer (MICOM) may be used, but the use of the MICOM costs a great deal.

SUMMARY

Accordingly, one or more exemplary embodiments provide an image forming apparatus and a power control method thereof, in which if the image forming apparatus is turned off by unexpected power-off such as a power failure and then resumed, a power status previously stored just before the power-off is ascertained to make the image forming apparatus operate in a last power status, thereby preventing power from being wastefully consumed or data from being lost.

Another exemplary embodiment is to provide an image forming apparatus and a power control method thereof, in which a microcomputer (MICOM) is not additionally needed for power control, thereby saving costs on production.

Still another exemplary embodiment is to provide an image forming apparatus and a power control method thereof, in which the stability of the image forming apparatus can be more enhanced while keeping a standby power of 1 W or less irrespective of presence of a mechanical switch.

According to an aspect of one or more embodiments, there is provided an image forming apparatus including: an image forming unit which forms an image; a power supply which supplies operating power for the image forming apparatus; a switching circuit unit which switches to selectively supply the operating power; a memory unit which stores information about power status of the switching circuit unit; and a controller which outputs a power control signal to control a switching operation of the switching circuit unit in accordance with the information about the power status stored in the memory unit if power is abnormally shut off and then supplied again from the power supply to the switching circuit unit.

The image forming apparatus may further include a key input unit through which a user input related to supply of the operating power is received, wherein the switching circuit unit includes a first switch turned on in response to the user input into the key input unit, and a second switch turned on/off in response to a power control signal of the controller, and the controller reads the information about the power status from the memory unit and outputs the power control signal for turning on/off the second switch to match with the read information about the power status if power is supplied to the switching circuit unit without a user input to the first switch.

The controller may initialize the image forming apparatus and monitor the user input to the first switch if the read information about the power status is "on".

The controller may record the power status of the switching circuit unit as "off" in the memory unit and control the switching circuit unit to shut off the operating power if the user input to the first switch is received.

The controller may back up data of the image forming apparatus, and control the switching circuit unit to shut off the operating power.

The controller may output a power control signal for turning off the switching circuit unit if the read information about the power status is "off".

The controller may record the power status of the switching circuit unit as "on" in the memory unit if power is supplied to the switching circuit by the user input to the first switch.

The controller may initialize the image forming apparatus, and monitor the user input to the first switch.

The controller may record the power status of the switching circuit unit as "off" in the memory unit if receiving the user input to the first switch, and control the switching circuit unit to shut off the operating power.

The controller may back up data of the image forming apparatus, and control the switching circuit unit to shut off the operating power.

The memory unit may include a non-volatile memory.

According to an aspect of one or more embodiments, there is provided a power control method of an image forming apparatus including a power supply for supplying operating power, and a switching circuit unit for switching to selectively supply the operating power, the power control method including: supplying power from the power supply to the switching circuit unit; reading information about power status from a memory unit storing information about power status of the switching circuit unit if power is abnormally shut off and then supplied again to the switching circuit unit; and outputting a power control signal for controlling a switching operation of the switching circuit unit in response to the read information about the power status.

The switching circuit unit may include a first switch turned on in response to a user input related to supply of the operating power, and a second switch turned on/off in response to the power control signal of the controller, and if power is supplied to the switching circuit unit without a user input to the first switch, the outputting of the power control signal may include outputting a power control signal for turning on/off the second switch to match with the read information about the power status.

The power control method may further include initializing the image forming apparatus; and monitoring a user input to the first switch, if the read information about the power status is "on".

The power control method may further include receiving the user input to the first switch; recording the power status of the switching circuit unit as "off" in the memory unit; and outputting the power control signal to shut off the operating power.

The power control method may further include backing up data of the image forming apparatus.

The outputting of the power control signal may include outputting the power control signal for turning off the switching circuit unit if the read information about the power status is "off".

The power control method may further include recording the power status of the switching circuit unit as "on" in the memory unit if power is supplied to the switching circuit unit by the user input to the first switch.

The power control method may further include initializing the image forming apparatus; and monitoring the user input to the first switch.

The power control method may further include recording the power status of the switching circuit unit as "off" in the memory unit if receiving the user input to the first switch to shut off the operation power as a monitoring result; and controlling the switching circuit unit to shut off the operating power.

The power control method may further include backing up data of the image forming apparatus.

The memory unit may include a non-volatile memory.

Still another aspect may be achieved by providing a power control method of an image forming apparatus including a power supply to supply operating power, a key input unit for receiving a user input related to supply of the operating power, and a switching circuit unit for switching to selectively supply the operating power, the power control method including: supplying power from the power supply to the switching circuit unit; recording a power status of the switching circuit unit as "on" in the memory unit if power is supplied to the switching circuit unit because the key input unit receives the user input requesting that power be supplied from the power supply to the switching circuit unit; and initializing the image forming apparatus.

The power control method may further include supplying power to a controller as the power is supplied to the switching circuit unit, and booting up the controller, wherein the image forming apparatus is initialized by the booted-up controller.

The power control method may further include monitoring the user unit to the key input unit; recording the power status of the switching circuit unit as "off" in the memory unit if receiving the user input to the first switch to the switching circuit unit because as a monitoring result; and outputting the power control signal to shut off the operating power.

The power control method may further include backing up data of the image forming apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION

Below, exemplary embodiments will be described in detail with reference to accompanying drawings.

Figure 1:
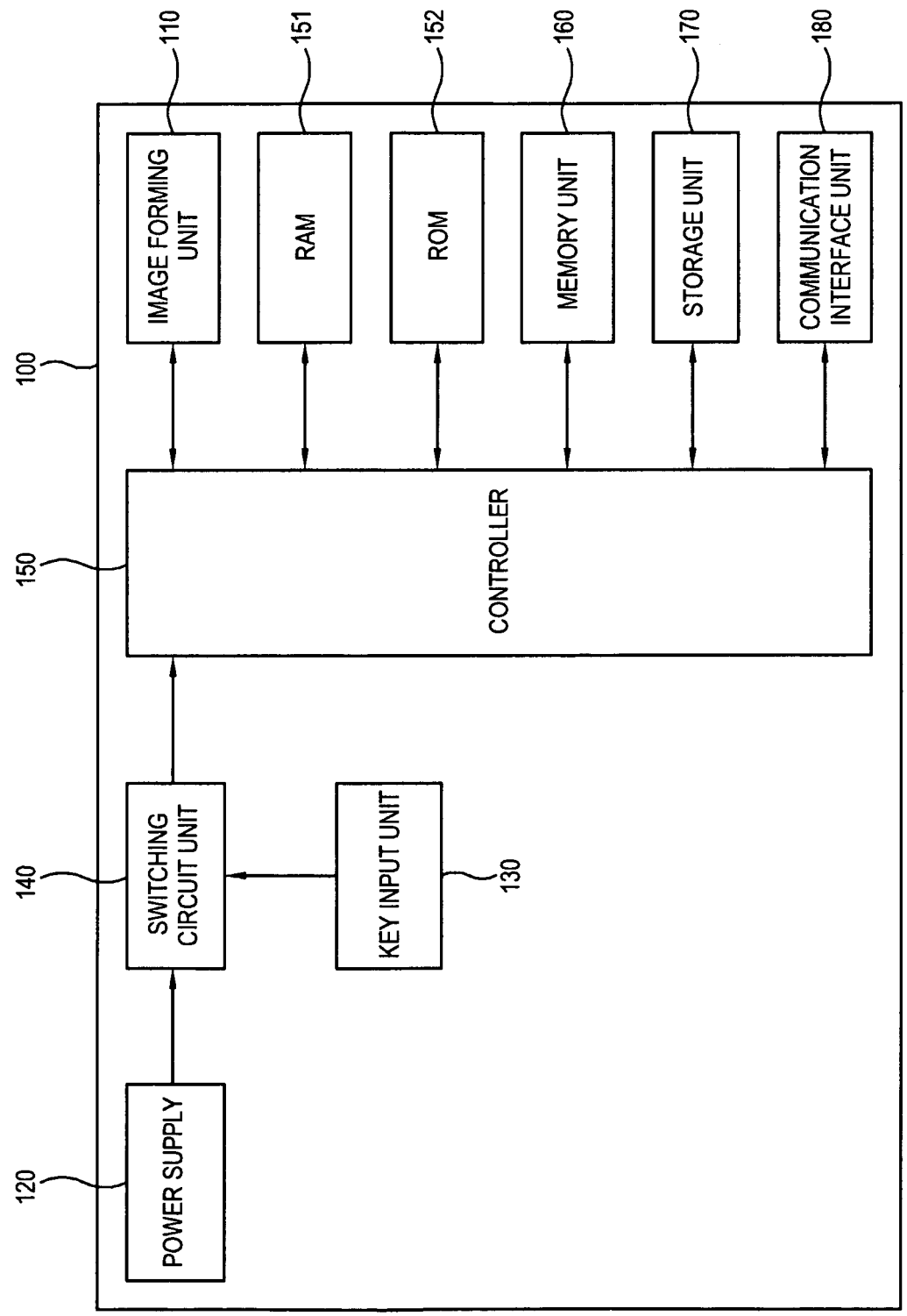
FIG. 1 is a block diagram showing a configuration of an image forming apparatus according to an exemplary embodiment.
Figure 2:
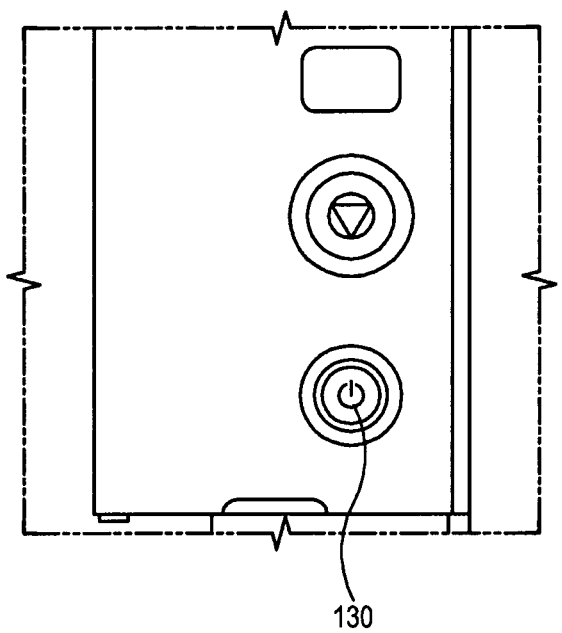
FIG. 2 is a circuit diagram of a switching circuit unit according to an exemplary embodiment.

FIG. 1 is a block diagram showing a configuration of an image forming apparatus according to an exemplary embodiment, and FIG. 2 is a circuit diagram of a switching circuit unit according to an exemplary embodiment.

An image forming apparatus 100 in this embodiment may be embodied by a printer, a copy machine, a facsimile, a multi-function peripheral having two or more functions, etc.

As shown in FIG. 1, the image forming apparatus 100 includes an image forming unit 110 which forms an image on a printing medium, a power supply 120 which supplies operating power to each component of the image forming apparatus 100, a key input unit 130 which receives input about "on/off" of the operating power from a user, a switching circuit unit 140 which performs a switching operation to selectively supply the operating power, a controller 150 which controls the switching operation of the switching circuit unit 140 in accordance with information about a power status stored in a memory unit 160 when being supplied with power, the memory unit 160 which stores the information about the power status of the switching circuit unit 140, a storage unit 170 which stores printing data, and a communication interface unit 180 which communicates data with the exterior such as a host device. The image forming apparatus 100 may further include a random access memory (RAM) 151 and a read only memory (ROM) 152 needed for operation of the controller 150.

Also, the image forming apparatus 100 may include an additional configuration such as a user interface (not shown) having a display for receiving a user input and displaying an operation status, an image scanner (not shown) scanning a document, and a fax unit (e.g., a modem but not shown) converting an image generated by the image scanner into a fax signal and transmitting it to an external facsimile through a public switched telephone network (PSTN) or receiving a fax signal from the exterior, etc.

The image forming unit 110 forms an image to be printed on at least one printing medium (paper) on the basis of printing data if there is a printing command. Here, the printing includes printing for copying after scanning a document, printing of received fax data, and printing of printing data stored in the interior (e.g., a hard disk drive) or the exterior (e.g., a universal serial bus (USB) memory) of the image forming apparatus 100 or received from the exterior through a host device 300 including a server. In this exemplary embodiment, the image forming unit 110 includes a developing unit having an image carrying body, an optical scanning unit, a transfer unit and a fixing unit.

Examples of the image forming apparatus 100 in this exemplary embodiment includes a monochromatic image forming apparatus using one developer (generally, black) to form an image, a color image forming apparatus using four developers to form a color image, and a multi-color image forming apparatus using an auxiliary developer such as a white developer besides the four developers to form a color image.

The power supply 120 supplies the operating power to each component of the image forming apparatus 100. As shown in FIG. 2, the power supply 120 converts external alternating current (AC) power to direct current (DC) power, and supplies it to the switching circuit unit 140.

The key input unit 130 receives a user input about the supply of the operating power.

Figure 3:
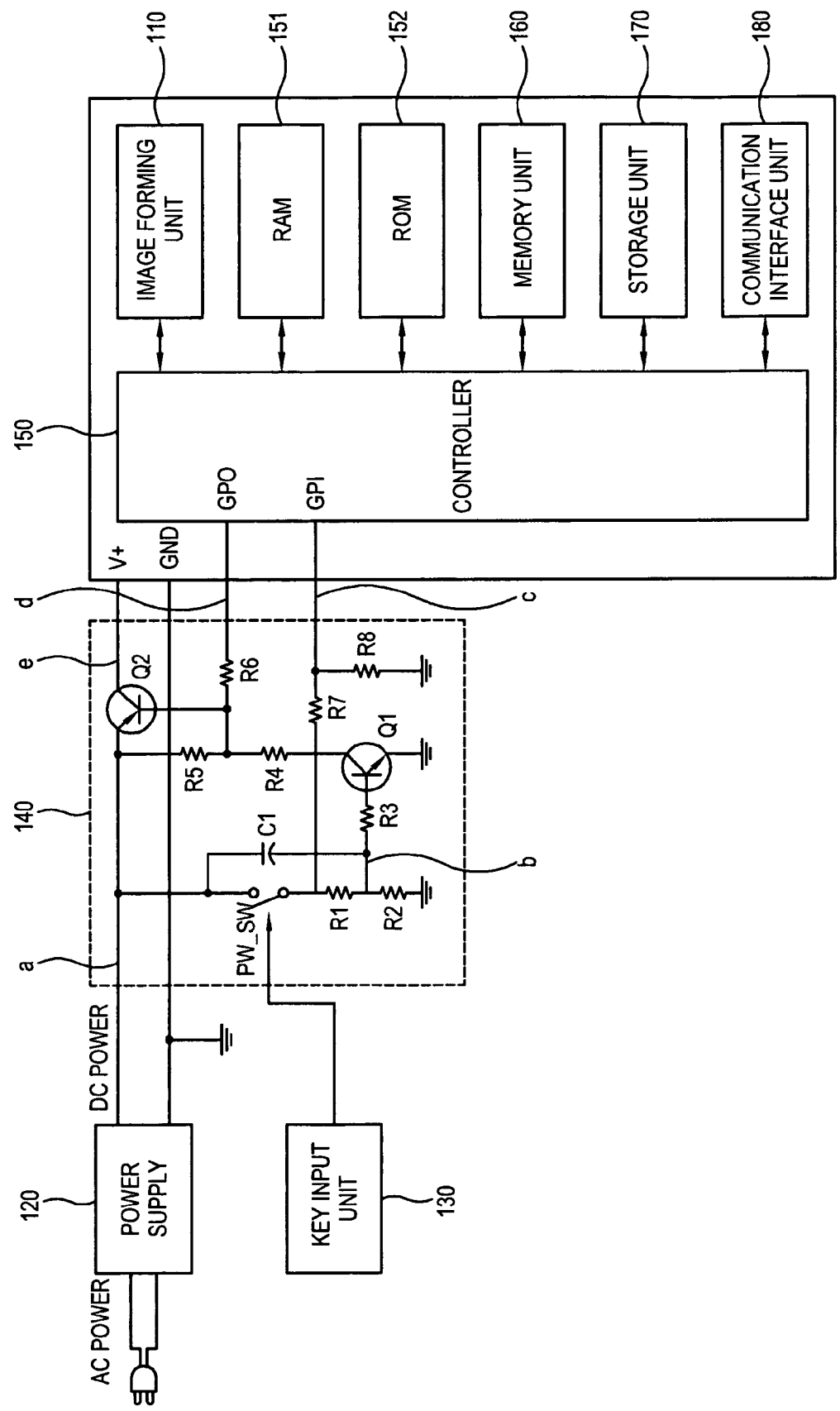
FIG. 3 shows an example of a key input unit provided in the image forming apparatus according to an exemplary embodiment.

FIG. 3 shows an example of the key input unit 130 provided in the image forming apparatus according to an exemplary embodiment.

Referring to FIG. 3, the key input unit 130 is a soft power button provided on a front side of the image forming apparatus 100, which becomes on/off in sequence in response to a user input. The key input unit 130 is placed on the front side of the apparatus for the convenience of a user.

If the key input unit 130 becomes (turns) on/off in accordance with a user input, a first switch PW_SW of the switching circuit unit 140 to be described later is also turned on/off.

The switching circuit unit 140 performs the switching operation to selectively supply the operating power from the power supply 120.

As shown in FIG. 2, the switching circuit unit 140 includes the first switch PW_SW turned on in response to a user input into the key input unit 130, and a second switch Q2 turned on/off in response to a power control signal of the controller 150.

Here, the switching circuit unit 140 is a secondary circuit that receives the DC power, at least a part of which receives standby power for preventing data loss or part damage even in a power-off status. For example, the standby power is supplied to the first switch PW_SW, a capacitor C1, a transistor Q1, and resistors R1, R2, R3, R4, R5 and R7 even in the power-off status.

Since the switching circuit unit 140 is configured with small-capacity devices, the applied standby power is maintained at 1 W or less.

The controller 150 receives the operating power from the power supply 120 through the switching circuit unit 140, and outputs a power control signal for controlling the switching operation of the switching circuit unit 140 to correspond to the power status information stored in the memory unit 160 when receiving power. Also, the controller 150 records the information about the power status of the memory unit 160 in response to a user input of the key input unit 130 when the power is supplied to the image forming apparatus 100.

The controller 150 may be achieved by a central processing unit (CPU) that controls general operation of the image forming apparatus 100.

The memory unit 160 stores information about the power status of the switching circuit unit 140. Specifically, if power is normally applied in response to a user input of the key input unit 130, the controller 150 records the information about the power status as "on" in the memory unit 160.

If a user inputs a power-off command by operating the key input unit 130 in the state that the information about the power status is stored as "on" in the memory unit 160, the controller 150 controls the information about the power status of the memory unit 160 to be changed into "off" and then recorded, and turns off the image forming apparatus 100.

Here, if power becomes off by an unexpected situation such as a power failure in the state that the information about the power status is stored as "on" in the memory unit 160, the image forming apparatus 100 is turned off while keeping the information about the power status stored as "on" in the memory 160.

The memory unit 160 is achieved by a non-volatile memory, and the non-volatile memory is internally provided with a buffer for storing the information about the power status.

The storage unit 170 may further store various information such as various setup values of the image forming apparatus 100, fax data, a scan image generated by the image scanner, user registration information set up according to user accounts, user authentication information, user right information, etc.

If a power-off command is input through the key input unit 130 or the power supplied from the power supply 120 is shut off, the controller 150 backs up data, with which the image forming apparatus 100 is operating, in the storage unit 170.

The storage unit 170 includes an internal storage medium such as a hard disk drive (HDD), or an external or portable storage medium such as a USB memory, a memory card (e.g., a memory stick, a compact flash (CF) card, multi-media card (MMC)), etc.

In the image forming apparatus 100 according to this exemplary embodiment, a separate memory unit 160 is provided for recording the information about the power status for enhancing a processing speed, but not limited thereto. Alternatively, the information about the power status may be stored in the storage unit 170 in order to decrease production costs.

The communication interface unit 180 communicates data with an external device including the host device. The communication interface unit 180 may include a wired/wireless communication module connectable to the external device via a network based on a predetermined protocol, or a communication interface such as a universal asynchronous receiver transmitter (UART) or a universal serial bus (USB).

Referring to FIG. 2, if power is supplied to the switching circuit unit 140, the capacitor C1 connected to the first switch PW_SW is charged with electricity, and an electric current increases in a base of a transistor Q1 connected to the capacitor C1, so that the transistor Q1 can be turned on. The power is also supplied to the controller 150, so that the controller 150 is booted up and performs operation. Here, the supply of power may include not only a normal case of supplying power in response to a user input into the key input unit 130, but also a case of resuming the supply of power after the power is abnormally shut off by an unexpected factor such as a power failure.

If the capacitor C1 is continuously charged with electricity, the electric current in the base of the transistor Q1 gradually decreases so that the transistor Q1 can be turned off, which equivalently acts as if the first switch PW-SW is pressed for a predetermined time.

Here, a time constant based on the capacitor C1 and the resistor is determined to keep an "on" status of the transistor Q1 until the controller 150 transmits a control command for turning on a second switch Q2 through a general purpose output (GPO) port.

The controller 150 determines whether to turn on/off the first switch PW_SW through a general purpose input (GPI) port connected to the first switch PW_SW.

That is, if the supply of power is based on a user input into the key input unit 130, information about "on" is transmitted to the controller 150 through the GPI port because the first switch PW_SW is in an "on" status.

On the other hand, if the supply of power is regardless of the user input into the key input unit 130 (e.g., if the supply of power is resumed after the power failure), information about "off" is transmitted to the controller 150 since the first switch PW_SW is in an "off" status.

When the first switch PW_SW is in the "on" status, it is determined that power becomes on by a user's operation of the key input unit 130 so that the controller 150 can record the information about the power status as "on" regardless of the information about the power status stored in the memory unit 160.

Then, the controller 150 normally boots up and initializes the image forming apparatus 100 and performs operation.

When the first switch PW_SW is in the "off" status, it is determined that power becomes on without a user's operation of the key input unit 130 and the supply of power is resumed after power is shut off by a power failure or the like. Thus, the controller 150 reads the information about the power status stored in the memory unit 160.

Here, if the information about the power status stored in the memory unit 160 is "off", it may be determined that power is temporarily shut off and then standby power is supplied again to the switching circuit unit 140 in a normal power-off status.

Thus, the controller 150 determines a last power status just before being turned off as "off" and outputs a control signal for turning off the second switch Q2 through the GPO port. If the second switch Q2 is turned off, the image forming apparatus 100 is also turned off and thus terminates all operations.

If the information about the power status stored in the memory unit 160 is "on", it may be determined that the supply of power is resumed after the power is abnormally shut off by a power failure or the like while the image forming apparatus 100 is in the power-on status.

Thus, the controller 150 determines the last power status just before being turned off as "on", so that the image forming apparatus 100 can be normally booted up and initialized and perform operations.

In addition, the controller 150 continuously monitors whether there is a user input into the key input unit 130 while the image forming apparatus 100 is turned on and normally performs the operation.

That is, the controller 150 continuously checks a signal GPI_PowerButton about the first switch PW_SW, received through the GPI port.

If the first switch PW_SW is turned on, the controller 150 determines that a user handles the key input unit 130 to turn off the image forming apparatus 100, and records the information about the power status as "off" in the memory unit 160.

Further, the controller 150 controls the storage unit 170 to back up printing data, with which the image forming apparatus 100 is working, or system data needed for operating the image forming apparatus 100, and outputs a control signal for turning off the second switch Q2 through the GPO port when the backup is completed. When the second switch Q2 is turned off, the image forming apparatus 100 is also turned off and terminates all operations. Thus, the last power status stored in the memory unit 160 is "off".

Figure 4:
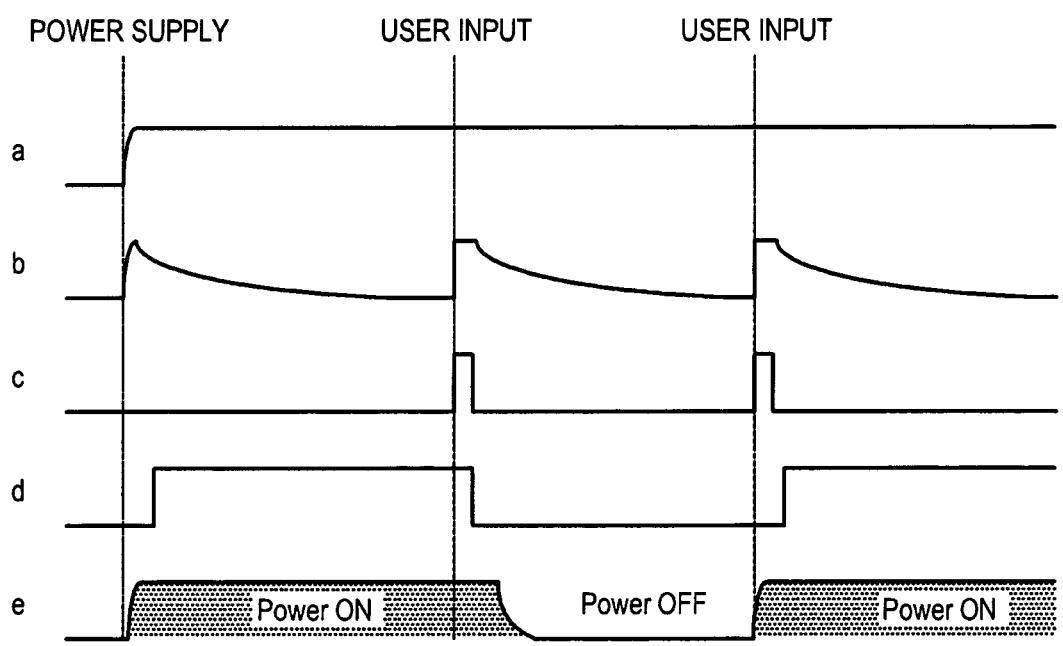
FIGS. 4 and 5 are graphs showing operation waveforms detected in each node of the switching circuit unit in accordance with information about a power status stored in a memory unit.
Figure 5:
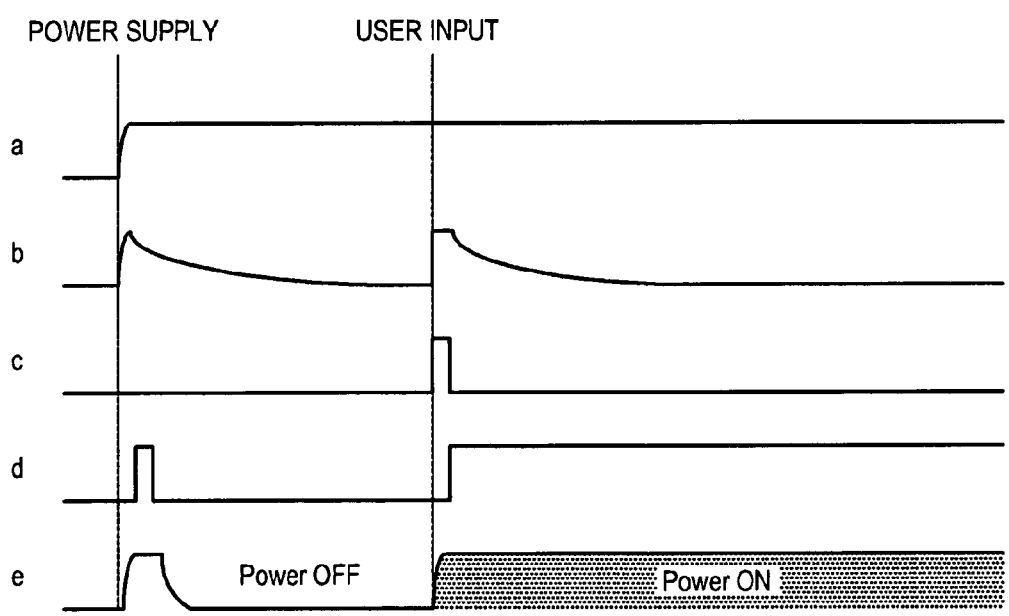

FIGS. 4 and 5 are graphs showing operation waveforms detected in each node of the switching circuit unit 140 in accordance with information about the power status stored in the memory unit 160.

The supply of power in FIGS. 4 and 5 corresponds to the case where the supply of power is resumed after the power is abnormally shut off by the power failure or the like regardless of a user's operation of the key input unit 130.

FIG. 4 illustrate that the power status is stored as "on" in the memory unit 160.

As shown in FIG. 4, a high signal is detected in a node a as power is supplied, and a signal in a node b is gradually lowered from high as the capacitor C1 is charged with electricity.

Since the power is supplied without operating the first switch PW_SW, a signal in a node c is maintained in a low status.

The controller 150 recognizes that the power is supplied without operating the first switch PW_SW on the basis of the signal in the node c input through the GPI port, and reads the information about the last power status stored in the memory unit 160.

In the case of the exemplary embodiment shown in FIG. 4, because the last power status is stored as "on" in the memory unit 160, the controller 150 outputs a high signal so that the second switch Q2 can be maintained in the "on" status, like a signal of a node d output through the GPO port.

Thus, the signal finally input to the second switch Q2 is a power-on signal, like a node e.

Then, the controller 150 monitors whether there is a user input into the key input unit 130, senses that the "on" status of the first switch PW_SW through the GPI port like the signal of the node c, and outputs a control signal for power-off by turning off the second switch Q2 through the GPO port.

In succession, if receiving an "on" signal of the first switch PW_SW through the GPI port through the power off status, the controller 150 outputs a control signal for power-on by turning on the second switch Q2 through the GPO port.

FIG. 5 illustrate that the power status is stored as "off" in the memory unit 160.

As shown in FIG. 5, a high signal is detected in a node a as power is supplied, and a signal in a node b is gradually lowered from high as the capacitor C1 is charged with electricity.

Since the power is supplied without operating the first switch PW_SW, a signal in a node c is maintained in a low status.

The controller 150 recognizes that the power is supplied without operating the first switch PW_SW on the basis of the signal in the node c input through the GPI port, and reads the information about the last power status stored in the memory unit 160.

In the case of the exemplary embodiment shown in FIG. 5, because the last power status is stored as "off" in the memory unit 160, the controller 150 changes the high signal into a low signal and outputs it so that the second switch Q2 can be changed into the "off" status, like a signal of a node d output through the GPO port.

Thus, the power is supplied only in a section where the signal of the node d is high, and the signal finally input to the second switch Q2 is a power-off signal, like a node e.

Then, the controller 150 monitors whether there is a user input in the key input unit 130, senses that the "on" status of the first switch PW_SW through the GPI port like the signal of the node c, and outputs a control signal for power-off by turning off the second switch Q2 through the GPO port.

Referring to FIGS. 4 and 5, it can be appreciated that the signal input to the node a indicates that the standby power is continuously received except the case where the power is shut off by an abnormal situation and then supplied again.

Figure 6:
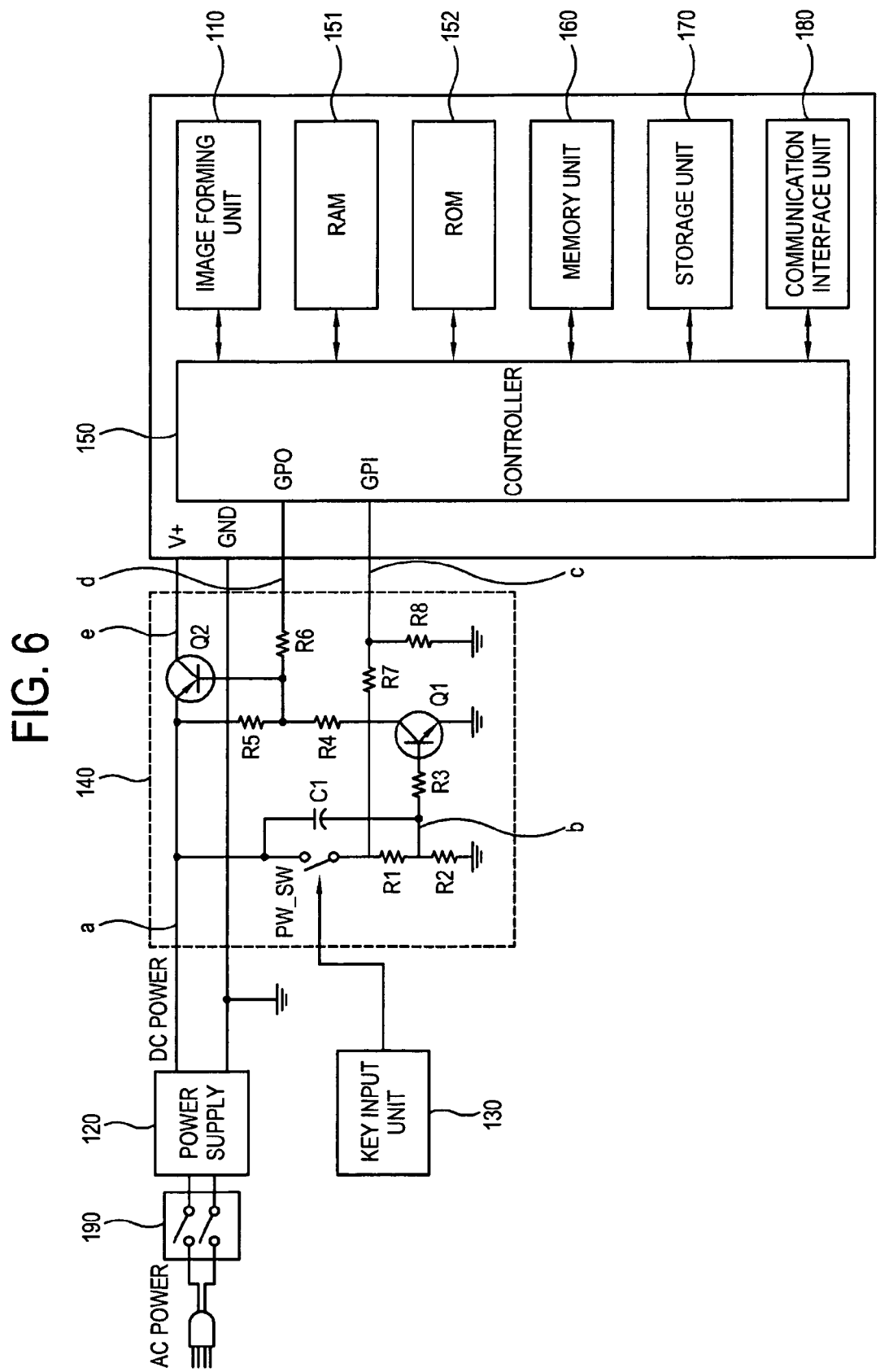
FIG. 6 shows a configuration of an image forming apparatus according to another exemplary embodiment.

FIG. 6 shows a configuration of an image forming apparatus 100 according to another exemplary embodiment.

As compared with the image forming apparatus 100 according to the foregoing exemplary embodiment, the image forming apparatus 100 in this exemplary embodiment shown in FIG. 6 further includes a mechanical switch 190 before a stage where the power supply 120 receives external power. Here, if the standby power exceeds a predetermined standard (e.g., 0.1 W, 0.5 W, 1 W, etc.) individually provided according to countries when the switching circuit unit 140 is turned off, the image forming apparatus 100 may include a separate mechanical switch 190.

Typically, there may be no need of the mechanical switch 190 if power consumption in a standby mode is 0.1 W or less (Korean standards) or 0.5 W or less (Environmental Protection Agency (EPA) standards). However, even though the image forming apparatus 100 satisfies the standards of the standby power, the separate mechanical switch 190 may be provided in the image forming apparatus 100 by taking safety of a product into account.

With regard to other elements than the mechanical switch 190, the same numerals and terms will be used, and repetitive descriptions will be avoided.

Figure 7:
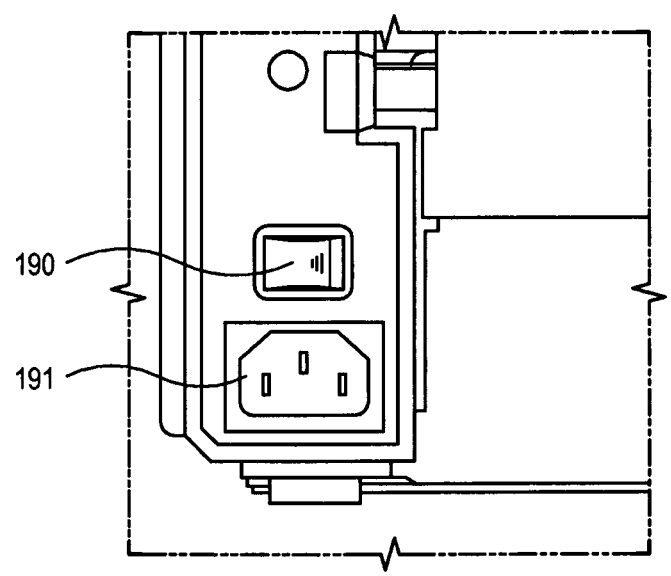
FIG. 7 shows an example of a mechanical switch provided in the image forming apparatus according to another exemplary embodiment.

FIG. 7 shows an example of the mechanical switch 190 provided in the image forming apparatus 100 according to another exemplary embodiment.

As shown in FIG. 7, the mechanical switch 190 is placed in the vicinity of a connector 191 for receiving external power (e.g., in a back side of the image forming apparatus 100), and completely shuts off AC power supplied from the exterior to the image forming apparatus 100.

The switching circuit unit 140 and the controller 150 in this exemplary embodiment operate equally to those of the foregoing exemplary embodiment, and the same waveforms as those of FIGS. 4 and 5 are detected.

In this exemplary embodiment, the case where the power is abnormally shut off regardless of a user's operation of the key input unit 130 and supplied again includes not only the power failure but also a case where a user turns off the mechanical switch 190 and then turn it on again in the state that power (including the standby power) is supplied to the switching circuit unit 140 of the image forming apparatus 100.

The image forming apparatus 100 in this exemplary embodiment may further include a power saving button (not shown) for entering a power saving mode (Hereinafter, referred to as a "sleep mode") or returning from the power saving mode to the standby mode, i.e., switching into a wake-up state.

The image forming apparatus 100 may enter the power saving mode if a preset time (e.g., 1 minute, 5 minutes, 10 minutes, 15 minutes, 30 minutes, 1 hours, etc.) is elapsed in the state that a printing operation is not being performed, or if there is a user input in the power saving button.

In the case of the image forming apparatus 100 having no separate power saving button, if a user input is detected corresponding to a soft power button, i.e., in the key input unit 130, a user is asked to select power-off or power-save (i.e., entering the power saving mode) and thus the image forming apparatus 100 may enter the power saving mode in accordance with a user's response. Also, if the key input unit 130 is handled for a predetermined period of time (e.g., for 2.5 seconds) in the power saving mode, the image forming apparatus 100 may be powered off.

In the power saving mode, power is not supplied to a liquid crystal display (LCD) window provided as a user interface, and only key inputs corresponding to the soft power button and the power save button are recognizable, so that the image forming apparatus 100 can be waken up in response to a key input corresponding to the soft power button and the power save button.

Also, the image forming apparatus 100 may be waken up not only by the key input corresponding to the soft power button and the power save button in the power saving mode, but also by operating an optional device such as sensing a printing command through the USB or a wired/wireless network, receiving a fax, opening/closing a cover for replacing a developer or the like, scanning, etc.

In the image forming apparatus with the foregoing configurations, a power control method thereof will be described with respect to FIGS. 8A and 8B.

Figure 8A:
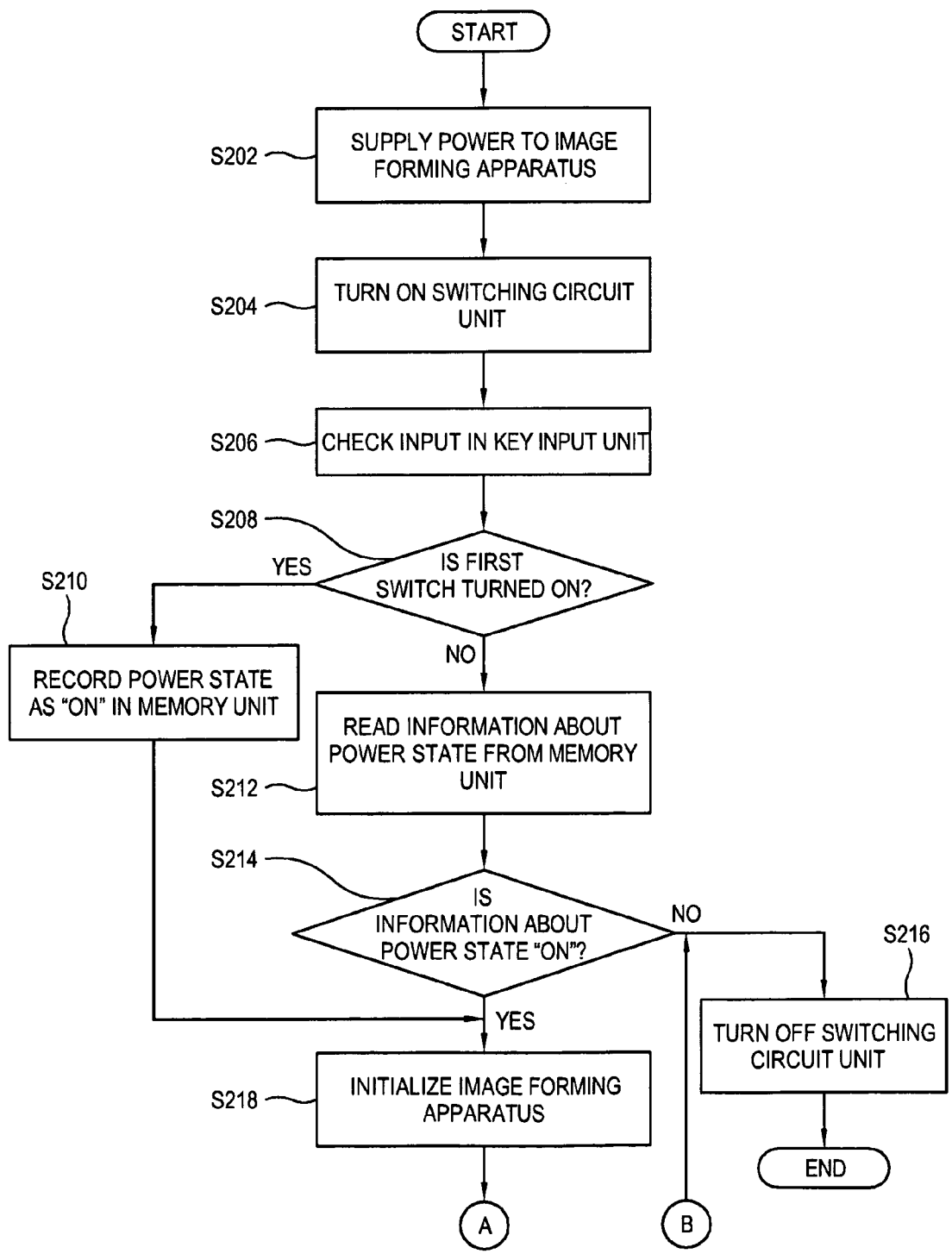
FIGS. 8A and 8B are a flowchart showing a power control method of the image forming apparatus according to an exemplary embodiment.
Figure 8B:
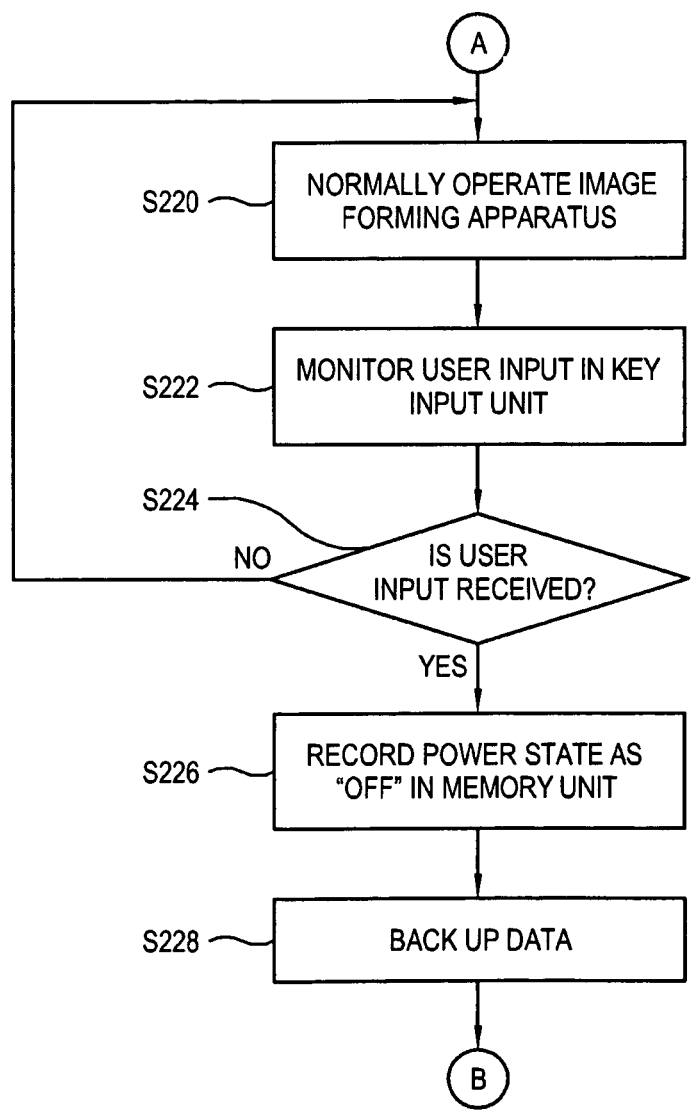

FIGS. 8A and 8B are a flowchart showing a power control method of the image forming apparatus according to an exemplary embodiment.

As shown in FIG. 8A, at operation S202, power may be supplied from the power supply 120 to the switching circuit unit 140 in the state that the image forming apparatus 100 is in the power-off status. Here, the supply of power may include supply of power in response to a user input into the key input unit 130; resumed supply of power after a power failure; supply of power by turning off the mechanical switch 190 and then turning it on again according to another exemplary embodiment; etc.

In the operation S202, if the image forming apparatus 100 receives the power, the controller 150 is booted up and thus a power-on control signal is output through the GPO port, thereby turning on the second switch Q2 of the switching circuit unit 140 at operation S204.

At operation S206, the controller 150 checks whether there is an input into the key input unit 130 with regard to the supply of power in the operation 202 on the basis of the signal input through the GPI port.

Specifically, the controller 150 determines whether the first switch PW_SW is in the "on" status or not at operation S208. That is, the first switch PW_SW is in the "on" status if the supply of power is based on the input into the key input unit 130, but the first switch PW_SW is in the "off" status if the supply of power is based on operating the physical switch 190 after a power failure. The controller 150 can determine whether the first switch PW_SW is in the on/off status on the basis of the signal input through the GPI port.

In the operation S208, if it is determined that the first switch PW_SW is in the "on" status, the supply of power is based on a user's operation of the key input unit 130 in the operation S202. Thus, at operation S210, the controller 150 records the information about the power status as "on" in the memory 160 regardless of the information about the last power status previously stored in the memory unit 160.

In the operation S208, if it is determined that the first switch PW_SW is in the "off" status, the supply of power is regardless of a user input into the key input unit 130 in the operation S202. Thus, at operation S212, the controller 150 reads information about the last power status stored in the memory unit 160.

If the information about the power status read in the operation S212 is "off", this corresponds to a case where the power supplied from the exterior is temporarily shut off and then supplied again in the "off" status of the switching circuit unit 140, i.e., while receiving only the standby power, and therefore the controller 150 outputs a control signal for turning off the second switch Q2 through the GPO port and the switching circuit unit 140 is turned off at operation S216.

If the information about the power status read in the operation S212 is "on", this corresponds to abnormal power shut-off (e.g., a power failure, turned-off of the mechanical switch 190, etc.) in the state that power is supplied to each element of the image forming apparatus 100, and therefore the controller 150 initializes the image forming apparatus 100 at operation S218.

As shown in FIG. 8B, if the initialization in the operation S218 is completed, the image forming apparatus 100 performs its own operations normally at operation S220.

In the state that the image forming apparatus 100 is turned on and normally performs the operations, the controller 150 continuously monitors whether there is a user input through the key input unit 130 at operation S222.

At operation S224, the controller 150 determines whether a user input for power-off is received into the key input unit 130 on the basis of the monitoring in the operation S222. Here, the controller 150 detects whether the first switch PW_SW is turned on as a user input into the key input unit 130, thereby determining whether there is the user input.

If it is detected that the first switch PW_SW is turned on in the operation S224, this corresponds to a case where the user input for power-off is received input the key input unit 130, and therefore the controller 150 records the information about the power status as "off" in the memory unit 160 at operation S226.

Further, the controller 150 controls the storage unit 170 to back up various data related to operations of the image forming apparatus 100 at operation S228.

If the data is completely backed up in the operation S228, the controller 150 outputs a control signal for turning off the second switch Q2 through the GPO port, and thus the switching circuit unit 140 is turned off at the operation S216.

If the switching circuit unit 140 is turned off in the operation S216, power is not supplied to the image forming apparatus 100 including the image forming unit 110, the controller 150, the RAM 151, the ROM 152, the memory unit 160, the storage unit 170 and the communication interface unit 180, but supplied to only at least a part of the switching circuit unit 140 configured with a small capacity device, thereby keeping the standby power of 1 W or less.

Accordingly, power control is possible by not the mechanical switch 190 but the switching circuit unit 140 turning on/off the DC power of the secondary circuit, and operation based on the last power status is possible when power is supplied again after unexpected power shut-off, thereby enhancing reliability of the image forming apparatus 100.

The switching circuit unit 140 according to an exemplary embodiment employs a small-capacity device to configure the secondary circuit for controlling the power without increasing costs due to the MICOM or the like, and may use a 24-hours timer or the like for controlling the power, thereby improving a user's convenience.

As apparent from the above description, there are provided an image forming apparatus and a power control method thereof, in which if the image forming apparatus is turned off by unexpected power-off such as a power failure and then resumed, a power status previously stored just before the power-off is ascertained to make the image forming apparatus operate in a last power status, thereby preventing power from being wastefully consumed or data from being lost.

Also, a microcomputer (MICOM) is not additionally needed for power control, thereby saving costs on production.

Further, the stability of the image forming apparatus can be more enhanced while keeping a standby power of 1 W or less irrespective of presence of a mechanical switch.

Although a few exemplary embodiments have been shown and described, it will be appreciated by those skilled in the art that changes may be made in these exemplary embodiments without departing from the principles and spirit of the disclosure, the scope of which is defined in the appended claims and their equivalents.

What is claimed is:

1. An image forming apparatus comprising:
   an image forming unit which forms an image;
   a power supply which supplies operating power for the image forming apparatus;
   a switching circuit unit which switches to selectively supply the operating power;
   a memory unit which stores information about power status of the switching circuit unit;
   a controller which outputs a power control signal to control a switching operation of the switching circuit unit in accordance with the information about the power status stored in the memory unit if power is abnormally shut off and then supplied again from the power supply to the switching circuit unit; and
   a key input unit through which a user input related to supply of the operating power is received, wherein the switching circuit unit comprises a first switch turned on/off in response to the user input into the key input unit, and a second switch turned on/off in response to the power control signal of the controller, wherein the controller reads the information about the power status from the memory unit and outputs the power control signal for turning on/off the second switch to match with the read information about the power status if power is supplied to the switching circuit unit without a user input to the first switch and the first switch is in an "off" status, and wherein the second switch is coupled between a general output port of the controller and the first switch.

2. The image forming apparatus according to claim 1, wherein the controller initializes the image forming apparatus and monitors the user input to the first switch if the read information about the power status is "on".

3. The image forming apparatus according to claim 2, the controller records the power status of the switching circuit unit as "off" in the memory unit and controls the switching circuit unit to shut off the operating power if the user input to the first switch is received.

4. The image forming apparatus according to claim 3, wherein the controller backs up data of the image forming apparatus, and controls the switching circuit unit to shut off the operating power.

5. The image forming apparatus according to claim 1, wherein the controller outputs a power control signal for turning off the switching circuit unit if the read information about the power status is "off".

6. The image forming apparatus according to claim 1, wherein the controller records the power status of the switching circuit unit as "on" in the memory unit if power is supplied to the switching circuit by the user input to the first switch.

7. The image forming apparatus according to claim 6, wherein the controller initializes the image forming apparatus, and monitors the user input to the first switch.

8. The image forming apparatus according to claim 7, wherein the controller records the power status of the switching circuit unit as "off" in the memory unit if receiving the user input to the first switch, and controls the switching circuit unit to shut off the operating power.

9. The image forming apparatus according to claim 8, wherein the controller backs up data of the image forming apparatus, and controls the switching circuit unit to shut off the operating power.

10. The image forming apparatus according to claim 1, wherein the memory unit comprises a non-volatile memory.

11. A power control method of an image forming apparatus comprising a power supply for supplying operating power, and a switching circuit unit for switching to selectively supply the operating power, and a controller, the power control method comprising:

supplying power from the power supply to the switching circuit unit;

reading information about power status from a memory unit storing information about power status of the switching circuit unit if power is abnormally shut off and then supplied again to the switching circuit unit; and outputting a power control signal from the controller to control a switching operation of the switching circuit unit in response to the read information about the power status, wherein the switching circuit unit comprises a first switch turned on in response to a user input related to supply of the operating power, and a second switch turned on/off in response to the power control signal of the controller, wherein if power is supplied to the switching circuit unit without the user input to the first switch and the first switch is in an "off" status, the outputting of the power control signal comprises outputting the power control signal for turning on/off the second switch to match with the read information about the power status, wherein the second switch is coupled between a general output port of the controller and the first switch.

12. The power control method according to claim 11, further comprising initializing the image forming apparatus; and monitoring the user input to the first switch of the switching circuit unit, if the read information about the power status is "on".

13. The power control method according to claim 12, further comprising receiving the user input to the first switch;

recording the power status of the switching circuit unit as "off" in the memory unit; and outputting the power control signal to shut off the operating power.

14. The power control method according to claim 13, further comprising backing up data of the image forming apparatus.

15. The power control method according to claim 11, wherein the outputting of the power control signal comprises outputting the power control signal for turning off the switching circuit unit if the read information about the power status is "off".

16. The power control method according to claim 11, further comprising recording the power status of the switching circuit unit as "on" in the memory unit if power is supplied to the switching circuit unit by the user input to the first switch.

17. The power control method according to claim 16, further comprising initializing the image forming apparatus; and monitoring the user input to the first switch.

18. The power control method according to claim 17, further comprising recording the power status of the switching circuit unit as "off" in the memory unit if receiving the user input to the first switch to shut off the operation power as a monitoring result; and controlling the switching circuit unit to shut off the operating power.

19. The power control method according to claim 18, further comprising backing up data of the image forming apparatus.

20. The power control method according to claim 11, wherein the memory unit comprises a non-volatile memory.

21. A power control method of an image forming apparatus comprising a power supply to supply operating power, a key input unit for receiving a user input related to supply of the operating power, a switching circuit unit for switching to selectively supply the operating power, and a controller which outputs a power control signal to control the switching operation of the switching circuit unit, the power control method comprising:

supplying power from the power supply to the switching circuit unit;

recording a power status of the switching circuit unit as "on" in a memory unit if power is supplied to the switching circuit unit because the key input unit receives the user input requesting that power be supplied from the power supply to the switching circuit unit; and initializing the image forming apparatus, wherein the switching circuit unit comprises a first switch turned on in response to a user input related to supply of the operating power, and a second switch turned on/off in response to the power control signal of the controller, wherein if power is supplied to the switching circuit unit without the user input to the first switch and the first switch is in an "off" status, the outputting of the power control signal comprises outputting the power control signal for turning on/off the second switch to match with the read information about the power status, and wherein the second switch is coupled between a general output port of the controller and the first switch.

22. The power control method according to claim 21, further comprising:

supplying power to the controller as the power is supplied to the switching circuit unit, and booting up the controller, wherein the image forming apparatus is initialized by the booted-up controller.

23. The power control method according to claim 21, further comprising monitoring the user input to the key input unit;

recording the power status of the switching circuit unit as "off" in the memory unit if receiving the user input to the first switch to shut off the operating power as a monitoring result; and outputting a power control signal to shut off the operating power.

24. The power control method according to claim 23, further comprising backing up data of the image forming apparatus.

* * * * *